Patented Feb. 9, 1954

2,668,765

UNITED STATES PATENT OFFICE 2,668,765

FROZEN CONCENTRATED MILK PRODUCTS

Edwin G. Stimpson, Sayville, N. Y., assignor to National Dairy Research Laboratories, Inc., Oakdale, N. Y., a corporation of Delaware No Drawing. Application November 2, 1951, Serial No. 254,661

13 Claims. (Cl. 99—55)

This invention relates to frozen concentrated milk products comprising hydrolyzed lactose-containing milk solids in an amount to delay age thickening on storage, and to processes of preparing such products.

Frozen whole milk concentrates have long been known, but they have not come into widespread use because they tend to age thicken on storage. This thickening is characterized by a change in the protein of the milk, which results in a grainy effect when the frozen product is reconstituted with water. In the final stages of age thickening, the protein becomes substantially insoluble in water. The storage temperatures most favorable to age thickening, 0 to +20° F., are commonly found to be the most practicable for storing frozen milk concentrates. Age thickening can be inhibited to a certain extent if the storage temperatures are kept below 0° F., especially between —10 and —20° F., but these temperatures are much more expensive both to produce and to maintain, and such storage conditions are much less available, from an equipment standpoint, than the storage temperatures in the range of 0 to +20° F.

Accordingly, it is an object of the present invention to provide processes for treating frozen concentrated milk products in order to delay age thickening on storage at temperatures within the range of 0° to 20° F.

It is a further object of the invention to provide frozen concentrated milk products which do not age thicken even after from six weeks to eight months storage at temperatures in the range from 0 to 20° F.

These objects are accomplished by incorporating hydrolyzed lactose-containing milk solids in the concentrated milk product prior to freezing. The hydrolyzed lactose-containing milk solids can be obtained by lactase hydrolysis of milk.

The invention is applicable to a wide variety of milk products. The term "milk product" is used generically throughout the specification and claims to refer not only to whole milk and skim milk but also to lactose-containing products derived from milk, including whey derived from casein or cheese manufacture, the mother liquor wash water obtained as a waste product in the production of lactose from whey or milk products, and lactalbumin mother liquors, such as those obtained following the precipitation of lactalbumin.

The invention is particularly applicable to cows' milk. However, the term "milk" as commonly used refers to the normal secretion of the mammary glands of a mammal and all milks contain an appreciable lactose content. It will therefore be understood that the invention is applicable as well to mares' milk, goats' milk, ewes' milk, etc., and hydrolyzed lactose-containing milk solids can be incorporated in any of these milks, whether or not the milk is the same as that from which the hydrolyzed lactose-containing milk solids are derived, in order to inhibit age thickening of the frozen concentrate.

The terms "hydrolyzed lactose-containing milk solids" and "hydrolyzed lactose milk solids" are generically and interchangeably used in the specification and claims to refer to milk solids the lactose content of which has been hydrolyzed by a lactase enzyme to glucose, galactose, and possibly other sugars. The term includes both the liquid products obtained by lactase hydrolysis of lactose in milk products, followed by inactivation of the enzyme, and the dry products obtainable from these liquid milk products by familiar milk drying techniques, of which more details will be given later.

The term "milk product" is generic, as defined above. If skim milk or whey is hydrolyzed with a lactase enzyme, the resulting milk product will comprise hydrolyzed lactose-containing milk solids-not-fat. The hydrolyzed products derived from whole milk will of course contain milk fat in addition to the solids-not-fat. The hydrolyzed lactose-containing milk solids can be derived not only from cows' milk, but also from mares' milk, goats' milk, ewes' milk, etc.

The amount of hydrolyzed lactose-containing milk solids required to produce a noticeable inhibiting effect upon age thickening will ordinarily be at least from 3 to 5% by weight of the milk solids. Such an amount may provide some delay in age thickening for as much as four weeks. The exact minimum proportion will vary, however, depending upon the source of the milk. Appreciably enhanced inhibiting effects will be obtained when larger amounts are employed. For example, 10 to 15% hydrolyzed lactose-containing milk solids mixed with 90 to 85% untreated milk solids will inhibit age thickening in a frozen concentrate stored at +15° F. for from 6 to 12 weeks. If substantially all, i. e., 85 to 90%, of the lactose content of the milk concentrate is hydrolyzed, the frozen concentrate can be stored at +15° F. for from 6 to 8 months without developing age thickening. It is thus evident that from the standpoint of a delay in age thickening there is no fixed upper limit to the amount of hydrolyzed lactose-containing milk solids which can be present in the frozen concentrate.

However, other factors may be persuasive in keeping the proportion of hydrolyzed lactose-containing milk solids at a low level. The larger the amount of hydrolyzed lactose, the sweeter the taste of the product. As the proportion of hydrolyzed lactose is decreased, in relation to the amount of unhydrolyzed lactose, the satisfactory storage period is shortened, but the flavor is less sweet. It will therefore be appreciated that a balance of these two effects can be taken into consideration in order to obtain both the longest required storage period and the least possible increase in sweetness of flavor.

The frozen concentrated milk products of the invention should have a solids content of at least 20% and preferably from 30 to 45% by weight. The solids content is largely a matter of choice. A solids content of 34.15% is particularly desirable from the standpoint of consumer acceptability because it can readily be reconstituted with two volumes of water to produce a product approximately equivalent to natural whole milk in solids content.

A concentrate having a solids content of 40 to 62.5% has a relatively high stability against bacterial decomposition, even in the liquid state. For this reason it may be desirable in effecting the purposes of the invention to prepare a liquid concentrate of a solids content within this range and maintain it at this solids content during processing in accordance with the invention. Where the keeping qualities of a high solids frozen product are not needed, the treated product can be diluted back to a lower solids content by addition of water prior to freezing.

Liquid products having solids contents in the range of 30 to 40% are preferred for processing purposes, inasmuch as the product at these viscosities has a workable viscosity and can be homogenized, a desirable step prior to freezing the product.

The frozen concentrated milk product in accordance with the invention ordinarily will in the course of its preparation from the original milk product have undergone concentration, pasteurization and homogenization at least once. The hydrolyzed lactose-containing milk solids can be incorporated therewith at any stage in its preparation prior to freezing. It is preferred, however, to incorporate the hydrolyzed lactose-containing milk solids therewith following concentration and any initial homogenization and pasteurization and prior to any final homogenization before the product is frozen. It is usually desirable to preheat whole or skim milk or cream prior to concentration in order to reduce the bacterial count sufficiently to prevent spoilage and/or development of rancidity at a later process stage.

The process operations of the invention will now be considered in greater detail.

The minimum preheating treatment can be carried out by holding the milk under conditions within the range from 6 seconds at 162.5° F. to 120 seconds at 120° F. The minimum treatment will sufficiently retard lipase activity to prevent the development of rancidity during later stages of the process, but may have little effect upon the bacterial count. A heat treatment which materially reduces the bacterial count is carried out by holding the milk at least under conditions within the range from 6 seconds at 162.5° F. to 1500 seconds (25 minutes) at 142° F.

The milk is concentrated at from 60 to 170° F., or at higher temperatures, if desired, but preferably at temperatures within the range from 100 to 165° F.

Because milk cannot readily be concentrated under atmospheric pressure at the higher temperatures, it is usually found convenient to concentrate the preheated milk under reduced pressure. The pressure used, as those skilled in the art are aware, controls the boiling point; lowering the pressure lowers the boiling point of milk, and hence lowers the concentrating temperature. A pressure not higher than 2 to 4 p. s. i. absolute is usually satisfactory, but very low pressures can be used for concentrating at lower temperatures, for example, for concentrating in the frozen state.

While low temperatures, i. e., 60 to 120° F., may be employed, unless the bacterial count is negligible following preheating it is usually desirable to concentrate at a temperature which discourages bacterial growth, i. e., about 120 to 140° F. or higher. This consideration is important in a commercial process, in view of the length of time required to concentrate large volumes of milk.

Concentration of the milk is continued to the desired solids content. However, as the solids content increases, protein coagulation may occur and care should be exercised to reduce the concentrating temperature to prevent excessive thickening of the product in the concentrating vessel. Milk concentrated to a 50% solids content is subject to protein coagulation at about 145° F., and milk of 60% solids content is subject to this condition at about 115° F.

The milk can be pasteurized directly after concentration. Where the milk is also to be homogenized it can be pasteurized either before or after homogenization, although in the usual case, because of possibilities of contamination and increase in bacterial count during homogenization, it will be found preferable to pasteurize following homogenization.

The maximum pasteurization times and temperatures extend from 15 seconds at 176.5° F. to 1800 seconds (30 minutes) at 156° F. The minimum pasteurization temperatures and times extend from 3 seconds at 176.5° F. to 1800 seconds at 150° F.

The milk can be homogenized at a temperature in the range from 120 to 165° F. and pressures in the range from 1500 to 5000 p. s. i. For a product having a solids content in the range of 30 to 40%, pressures from 1500 to 3500 p. s. i. are preferred. As has been stated, homogenization can be carried out before or after pasteurization.

The homogenized pasteurized concentrate is then ready for further treatment in accordance with the invention in order to provide therein a suitable proportion of hydrolyzed lactose-containing milk solids. Several modes of carrying out this aspect of the invention are available.

In one procedure, the hydrolyzed lactose milk solids are created in situ in the concentrate by treating it directly with a lactase enzyme and permitting enzyme action to proceed until a proportion of lactose has been hydrolyzed to simple sugars. Satisfactory inhibition is obtainable in such a product if the hydrolysis is allowed to proceed to at least 10%, as measured by decrease in lactose content, but as has been indicated previously, the hydrolysis can be permitted to proceed to its utmost extent, which may range from 80 to 95% if desired. At higher solids contents, it may be desirable to employ a larger proportion of hydrolyzed lactose milk solids.

A product whose lactose content is to be hydrolyzed directly in accordance with this procedure should have a solids content of at least 20% and preferably 30% or more and will have been pasteurized prior to inoculation with the lactase enzyme. Homogenization is desirable but not essential.

The lactase enzyme which can be employed to hydrolyze lactose in milk to simple sugars can be prepared in any of several ways which have been described in more detail elsewhere and therefore need not be set forth herein. The lactase can be obtained from yeast and purified by extracting the enzyme-containing material with organic solvents, such as ethyl ether or petroleum ether, to remove excessive lipoid materials and flavor constituents. The lactose can also be a purified material obtained by extracting crude enzyme preparations by various salt extractions known to those skilled in the art. An example of one method of preparing a lactase enzyme which can be employed to prepare hydrolyzed lactose-containing milk solids useful in accordance with the invention is given in Example 1.

After inoculation with the lactase enzyme, the concentrate is held under conditions favoring lactase hydrolysis of lactose. Temperatures over a wide range, from 25 to 135° F., may be employed. The lactase activity is higher at the more elevated temperatures; at 25° F., from 9 to 10 days may be necessary for hydrolysis to reach its fullest extent. Holding the milk at temperatures above 135° F. will inactivate the enzyme, and at any time hydrolysis is to be arrested this may be done by heating the milk to above 135° F. Hydrolysis reaches its fullest extent, i. e., 80% to 95%, in from 4 to 5 hours at temperatures from 120 to 130° F.

The amount of enzyme added to the milk product will depend upon the potency of the lactase preparation and the amount of lactose in the milk product, as well as on the proportion of lactose that is to be hydrolyzed. Thus the amount of enzyme used may be widely varied, but in general from 1.5% to 3% of enzyme by weight of the quantity of lactose present in the milk product is employed in order to achieve substantially complete, i. e., 80 to 95%, hydrolysis of the lactose. Proportionately lower amounts of enzyme can be employed where a lesser degree of hydrolysis is desired.

The hydrolysis can be halted at any time by treating the mixture to inactivate the lactase enzyme. Pasteurization by a holding method, as, for example, heating the mixture at 160° F. for 30 minutes, is effective for this purpose. If the mixture is merely frozen and stored at 0° F. or below, enzyme activity is arrested but will resume when the mixture is reheated to room temperature or above.

The hydrolyzed product can be further concentrated, if desired.

In another mode of accomplishing the invention previously formed hydrolyzed lactose-containing milk solids are added to the milk product. The hydrolyzed lactose-containing milk solids can be obtained by lactase hydrolysis of milk as outlined above. The liquid product can be used, or, in a further refinement of this process, the lactase hydrolyzed milk product can be frozen or dried by any convenient method prior to incorporation in the milk. It can, for example, be dried in a spray dryer whose inlet air stream is at a temperature of about 250° F. and whose outlet air stream is at a temperature of approximately 170° F. The dry powder is cooled to room temperature as quickly as possible and stored at 40° F. until use.

The hydrolyzed lactose-containing milk solids are incorporated by simple mixing, and no special techniques are required.

This procedure is especially adapted for commercial operation where it is convenient to prepare large batches of dry hydrolyzed lactose-containing milk solids or liquid dispersions or solutions thereof for use in treating milk in accordance with the invention. It is also useful in any case where it is desired to prepare a product having a uniform ratio of hydrolyzed lactose-containing milk solids to nonhydrolyzed lactose-containing milk solids. It is easier to attain a particular hydrolyzed lactose-nonhydrolyzed lactose ratio in a given milk product by adding hydrolyzed lactose-containing milk solids than by arresting the lactase hydrolysis at a desired degree of hydrolysis.

By this procedure, a simulated whole milk, equivalent to whole milk in milk fat and milk solids-not-fat contents, can be obtained by blending a hydrolyzed lactose-containing skim milk (in which the lactose hydrolysis is either complete or partial) with cream and unhydrolyzed raw milk to obtain an appropriate milk fat:milk solids-not-fat ratio. In this way, frozen milk concentrates containing a variety of butter fat and solids-not-fat contents can be prepared, depending upon which are used of the following combinations, either or both components of which can contain hydrolyzed lactose milk solids, and the proportion of each constituent: whole milk or a mixture of whole milk and cream, whole milk and skim milk, cream and skim milk, cream and concentrated milk, whole milk and concentrated skim milk, and concentrated cream and concentrated skim milk. Hydrolyzed lactose-containing skim milks are easier to work with than hydrolyzed lactose-containing whole milks, and therefore nonhydrolyzed lactose-containing whole milk and cream are usually employed, in conjunction with hydrolyzed lactose-containing skim milk, in the above combinations.

From the standpoint of flavor acceptability, there is an optimum solids-not-fat content for any given butter fat content. For milk containing 2.5% butter fat, the most acceptable flavor is obtained when the solids-not-fat content is in the range from 10.2 to 10.7%, whereas if the butter fat content is 4.5%, the most acceptable flavor is obtained when the solids-not-fat content is 9.2 to 9.7%. This ratio is referred to in the claims as an optimum fat:solids-not-fat ratio.

In a further variation of the several modes of incorporating hydrolyzed lactose milk solids, the milk to be treated in accordance with the invention is separated into two portions. One portion is reserved and the other portion is treated with a lactase enzyme as set forth in the first procedure, in order to effect hydrolysis of lactose. When the hydrolysis has proceeded to the desired extent, the lactase enzyme is inactivated and the milk recombined with the portion remaining from the original milk. This procedure has all of the advantages of the second procedure referred to above, but it avoids mixing milk batches and may be desirable where milk of inferior quality is being processed along with milk of superior quality.

In this connection, it is noted that when concentrates having a solids concentration in the order of 50 to 60% are to be prepared, it is usually preferable to mix hydrolyzed lactose-containing milk solids with the unhydrolyzed milk concentrate at an intermediate solids concentration of approximately 30 to 40%, followed by a further condensation of this material to the ultimate desired concentration. When concentrations initially of a solids content of 50 to 60% are prepared, lactose may crystallize even before the hydrolyzed lactose-containing milk solids can be incorporated therewith. However, hydrolyzed lactose-containing milk solids inhibit crystallization of the lactose in the finished product, so that if the solids content is brought to this high level after blending with the hydrolyzed lactose-containing milk solids, crystallization of lactose can be avoided.

It has been found that after addition of the hydrolyzed lactose-containing milk solids it is desirable to homogenize the milk concentrate. This is true even if the product has been homogenized previously. Homogenization just prior to freezing tends to further delay frozen age thickening. The concentrate can be homogenized at a temperature in the range from 120 to 165° F. and a pressure within the range from 1500 to 5000 p. s. i. For a product having a solids concentration in the range of 30 to 40%, pressures from 1500 to 3500 p. s. i. are preferred. It is difficult to homogenize a concentrate having a solids content appreciably in excess of 40%, and it will therefore be found desirable to dilute products having higher solids contents prior to homogenization for best results. Of course, there is no reason why a product having a solids content in excess of 40% could not be prepared without this final homogenization where very long storage periods will not be encountered.

The finished product is frozen by cooling to a temperature of 27° F. or below, depending upon its freezing point, which is dependent upon its solids content. A concentrate having a solids content of 34% freezes just below 27° F. It can then be stored at a temperature at which it will remain frozen, say from −20 to +20° F. Although it is not necessary to employ storage temperatures below 0° F., because of the inhibiting effect of the hydrolyzed lactose-containing milk solids, nevertheless the higher the temperature of storage the quicker the product will develop age thickening and, taking into account the inhibiting effect of the hydrolyzed lactose-containing milk solids, an appreciably longer delay in development of age thickening will be obtained at the lower storage temperatures, i. e., below 0° F.

The following examples are illustrative:

EXAMPLE 1

The solids content of whey derived from casein or cheese manufacture is adjusted to 2 to 8% by weight and its pH is brought to within the range from 4.5 to 7.0, either by addition of lime or lactic acid or by inoculation with lactic acid-producing bacteria. The whey is then heated at 185° F. for 30 minutes in order to coagulate the protein, and the coagulated protein is separated by decantation or filtration.

The deproteinated whey is pasteurized at 145° F. for 45 minutes and its pH then brought to 4.5. The whey is inoculated with yeast of a lactase-producing strain, such as *Saccharmoyces fragilis*, and allowed to ferment for from 10 to 30 hours at a temperature of approximately 86° F. with aeration, and from 0.009 to 0.5 volume of air per volume of medium per minute.

The yeast cells are separated from the fermentation liquor and washed with warm water to form a yeast cream of from 10 to 18% solids content and fed into a spray drier whose inlet air stream is at approximately 250° F. and whose outlet air stream is at approximately 170° F. The dry yeast powder is cooled to room temperature as quickly as possible after leaving the spray drier and is stored at 40° F. until use. During drying the zymase is rendered inactive, but lactase activity is substantially unaffected. This product is the lactase enzyme preparation employed to prepare hydrolyzed lactose milk solids for use in the examples which follow in accordance with the invention. It has strong potency and good stability, a good light color and a bland flavor, and does not impart an undesirable flavor to milk products in which it is incorporated.

Raw whole milk suitable for human use is separated and the resulting skim milk pasteurized at 160° F. for 30 minutes, then condensed in vacuo at 123° F. to a 30% solids content. Yeast lactase prepared as set forth above is dispersed in four times its weight of water to form a slurry and this slurry is added to the skim milk in a ratio of one part by weight yeast lactase to each 50 parts by weight of lactose in the skim milk. During addition of the lactase slurry the skim milk is agitated vigorously. The mixture is then held at 123° F. for four hours, at the end of which time 80 to 90% of the lactose has been converted to simple sugars. In order to inactivate the lactase enzyme, the mixture is heated at 160° F. for 30 minutes. The product can be cooled and stored for use as a source of hydrolyzed lactose milk solids in accordance with the invention, or it may be dried by feeding it into a spray drier whose inlet air stream is at a temperature of about 250° F. and whose outlet air stream is at approximately 170° F. The dried product can likewise be employed as hydrolyzed lactose milk solids-not-fat in several of the examples which follow in place of the liquid product. It has the advantage, compared to the liquid product, of increasing the solids content of the concentrate and can also be stored more readily and added more conveniently to the concentrate.

For example, whole milk suitable for human consumption is received and clarified in the cold. After preheating at 145° F. for 10 minutes the milk is concentrated at 145° F. to 35% total solids. The concentrate then is homogenized at 145° F. and 2500 p. s. i. and pasteurized at 155° F. for 30 minutes. The homogenized and pasteurized unhydrolyzed whole milk concentrate is mixed with the hydrolyzed concentrate in a proportion such that the final blend contains 85% unhydrolyzed solids and 15% hydrolyzed solids. When completely blended the mixture is cooled to 40° F., packaged in quart containers and placed in the hardening room at −20° F. until completely frozen. The milk can then be kept at 15° F. for at least 10 weeks in good condition.

EXAMPLE 2

Whole milk suitable for human consumption is received and clarified in the cold. The milk is preheated at 145° F. for 10 minutes and concentrated at the same temperature under reduced pressure to 35% total solids. The concentrate then is homogenized at 145° F. and 2500 p. s. i., pasteurized at 155° F. for 30 minutes and finally cooled to 123° F. The concentrate then is divided into two portions.

One portion of the concentrate is treated with 1 part of yeast lactase to 120 parts of whole milk solids and the mixture allowed to stand at 123° F. for four hours. At the end of this time the lactose is from 85 to 95% converted to glucose and galactose. The enzyme then is inactivated by heating the mixture to 145° F. and maintaining this temperature for 30 minutes. The hydrolyzed concentrate then is recombined with the unhydrolyzed homogenized pasteurized whole milk concentrate in a proportion such that the final blend contains 85% unhydrolyzed lactose-containing milk solids and 15% hydrolyzed lactose-containing milk solids. The mixture is cooled to 40° F., packaged in quart containers and placed in the hardening room at −20° F. until completely frozen. The material will remain in good condition for at least 10 weeks when stored at +15° F.

EXAMPLE 3

A frozen whole milk concentrate is prepared and blended as described in Example 2, except that after recombining the hydrolyzed and unhydrolyzed lactose-containing milks the mixture is given an additional homogenization at 125° F. and 2500 p. s. i. The mixture is then cooled, packaged and frozen at −20° F. as before. The product will remain in good condition for at least 12 weeks when stored at +15° F.

EXAMPLE 4

Raw whole milk is flash pasteurized at a temperature of 180° F. for 15 seconds and then concentrated in vacuo to 20% solids. The temperature of the concentrated milk is adjusted to 123° F. and a yeast lactase slurry added in the ratio of 1 part yeast lactase solids to each 50 parts of lactose solids in the milk. The mixture is incubated at 123° F. for one hour, after which time the hydrolysis is approximately 40 to 50% complete.

The product is heated at 160° F. for 30 minutes in order to inactivate the lactase enzyme. It is then cooled to 40° F., packaged in quart containers and placed in the hardening room at −20° F. until completely frozen. The material will remain in good condition for at least 10 weeks when stored at +15° F.

EXAMPLE 5

Example 4 is repeated, homogenizing the hydrolyzed product at 125° F. and 2500 p. s. i. just prior to cooling, packaging and freezing. This product will remain in good condition for at least 12 weeks when stored at +15° F.

EXAMPLE 5A

Skim milk is conducted through a heat exchanger where it is heated to just below 185° F. and held at that temperature for 15 seconds in order to reduce the lipase activity and bacterial count, after which it is immediately flashed into a vacuum chamber. The skim milk is circulated from the vacuum chamber through a heat exchanger supplied with hot water at 165° F., and then back into the vacuum chamber which is held at a temperature of 110° F. and a pressure of 1.25 p. s. i. absolute, until 77% of the water contained therein has been removed. The product consequently will have a solids content of 30%.

The concentrate is cooled to 123° F. and 1 part by weight of yeast lactase is added to each 90 parts by weight of skim milk solids. The mixture is then allowed to stand at 123° F. for 30 minutes to inactivate the lactase yeast enzyme. This hydrolyzed skim milk is then mixed with unhydrolyzed whole milk and 40% cream in such proportions as to obtain a final product having about 10% butter fat and 30% total solids.

The resulting concentrate is homogenized at 125° F. at 2500 p. s. i., packaged and frozen at −20° F. The frozen concentrate will remain in good condition when stored at +15° F. for approximately 12 weeks or longer.

EXAMPLE 6

Whole raw milk is heated to a temperature above 160° F. but not exceeding 162.5° F. for 5 seconds in order to reduce lipolytic activity and then drawn into the first effect of a double effect evaporator operating at an absolute pressure not over 3.3 p. s. i., where it is heated to 145° F. and a proportion of the water content thereof removed, and then into the second effect of the evaporator operated at an absolute pressure not over 1.7 p. s. i. and a temperature of 120° F. The milk in the evaporator is maintained in motion at sufficient velocity to ensure a rapid transfer of heat from the heating surfaces within the evaporator to the milk. After the milk concentration has reached 40% solids, within about 1½ hours, the milk is withdrawn and brought to a solids content of 34.15% by addition of water. Hydrolyzed lactose-containing milk solids-not-fat, prepared by spray drying a hydrolyzed liquid milk concentrate as set forth in Example 1, is added to the diluted concentrate in the proportion of about 20% by weight of the solids content of the concentrated milk. The resulting concentrate has a solids content of about 40% and is homogenized at 120° F. and 2500 p. s. i., pasteurized at 175° F. for 16 seconds, packaged in quart containers, cooled to −20° F. and frozen. This product will keep for over 10 weeks when stored at +15° F.

EXAMPLES 7 TO 18

Whole milk is received and clarified in the cold. After preheating to 145° F. for 10 minutes the milk is concentrated at the same temperature under reduced pressure to a solids content of 33%. A portion is removed and concentration of the remainder is continued to a solids content of 43%. Each of the concentrates then is heated to 145° F. and homogenized at 2500 p. s. i., followed by pasteurization at 155° F. for 30 minutes.

The concentrated milks thus prepared are divided into several portions and to each portion is added a liquid hydrolyzed lactose-containing milk concentrate prepared as set forth in Example 1 in proportions to give a final concentrate containing from 3 to 15% hydrolyzed lactose-containing milk solids-not-fat. Portions of the untreated milk concentrates are reserved as controls. Also, to one sample of the untreated milk 3% invert sugar and to another a small proportion of inactive lactase yeast are added for comparison purposes. All of the concentrates are then immediately packaged and frozen at −20° F. Some of the samples are homogenized at 125° F. and 2500 p. s. i. just prior to freezing.

All of the samples are stored at 12 to 15° F. and their flavor and character noted after 2, 4, 7, 9 and 11 weeks of storage at this temperature.

The results set forth in the following tables are typical:

Table I
CONCENTRATE HAVING 33% SOLIDS CONTENT

| Ex. No. | Percent Hydrolyzed Lactose-Containing Milk Solids | | Storage Period at +12 to +15° F. (Weeks) | | | | | |
|---|---|---|---|---|---|---|---|---|
| | | | 0 | 2 | 4 | 7 | 9 | 11 |
| 7 | 10% [1] | Body | Smooth | Thin; Free Flowing. | Free Flowing | Free Flowing | Free Flowing | Semi-Solid Mass.[2] |
| | | Flavor | Good | Very Good | Fair; Slightly Oxidized Taste. | Good | Good | |
| 8 | 10% | Body | Smooth | Thin; Free Flowing. | Grainy Viscous | Free Flowing | Free Flowing | Semi-Solid Mass.[2] |
| | | Flavor | Good | Good | Good | Good | Good | |
| 9 | 5% | Body | Smooth | Very Grainy Set Up. | Grainy; Viscous | Semi-Solid Mass.[2] | | |
| | | Flavor | Good | Good | Good | | | |
| 10 | 3% | Body | Smooth | Very Grainy | Grainy; Viscous | Semi-Solid Mass.[2] | | |
| | | Flavor | Good | Fair (Off Taste) | Fair | | | |
| 11 | 0%+3% Invert Sugar. | Body | Smooth | Very Grainy Set Up. | Grainy; Viscous [2] | | | |
| | | Flavor | Good | Very Good | Good | | | |
| 12 | 0% | Body | Smooth | Slightly Grainy | Grainy; Viscous | Semi-Solid Mass.[2] | | |
| | | Flavor | Good | Good; Slightly Oxidized Taste. | Fair | | | |

[1] Homogenized at 125° F. and 2,500 p. s. i. before freezing.
[2] Product would not reconstitute to give a liquid milk.

Table II
CONCENTRATE HAVING 43% SOLIDS CONTENT

| Ex. No. | Percent Hydrolyzed Lactose-Containing Milk Solids | | Storage Period at +12 to +15° F. (Weeks) | | | | | |
|---|---|---|---|---|---|---|---|---|
| | | | 0 | 2 | 4 | 7 | 9 | 11 |
| 13 | 15% [1] | Body | Smooth | Thin; Free Flowing. | Grainy; Free Flowing. | Almost Solid Mass. | Almost Solid Mass. | Solid Mass.[2] |
| | | Flavor | Good | Fair; Grainy | Good; Grainy | Good; Sweet | Good | |
| 14 | 15% | Body | Smooth | Solid Mass | Solid Mass | Solid Mass [2] | | |
| | | Flavor | Good | Fair; Slightly Off Taste. | Fair; Slightly Off Taste. | | | |
| 15 | 8% | Body | Smooth | Solid Mass | Solid Mass [2] | | | |
| | | Flavor | Good | Good | Good; Grainy | | | |
| 16 | 3% | Body | Smooth | Solid Mass | Solid Mass [2] | | | |
| | | Flavor | Good | Fair; Powdery | Good; Grainy | | | |
| 17 | 0% + inactive yeast. | Body | Smooth | Solid Mass | Solid Mass [2] | | | |
| | | Flavor | Good | Good | Fair; Off Taste | | | |
| 18 | 0% | Body | Smooth | Solid Mass | Solid Mass | Solid Mass [2] | | |
| | | Flavor | Good | Good | Good; Grainy | | | |

[1] Homogenized before freezing at 125° F. and 2,500 p. s. i.
[2] Product would not reconstitute to give a liquid milk.

It is evident that the age thickening of the frozen concentrate is retarded in proportion to the ratio of hydrolyzed lactose-containing milk solids to non-hydrolyzed milk solids. The presence of 3 to 5% hydrolyzed lactose-containing milk solids in the concentrate having 33% solids content is effective for a few weeks (Examples 9 and 10), while 10% hydrolyzed lactose-containing milk solids (Example 8) retards age thickening for 9 to 10 weeks. Homogenization of the 10% product prior to freezing (Example 7) give a still further improvement. When the solids content of the concentrate (Table II) is increased Example 14 shows that 15% hydrolyzed lactose-containing milk solids is not quite enough. Homogenization of the 15% mixture just prior to freezing (Example 13) is however enough to give a delay in age thickening. A 43% solids concentrate can be stabilized by higher proportions of hydrolyzed lactose milk solids without homogenization.

It will be noted that the controls in each case (Examples 12 and 18) thicken to a solid mass more rapidly than the concentrates successfully treated in accordance with the invention.

The invert sugar (Example 11) and inactive yeast (Example 17) had no beneficial effect upon age thickening.

EXAMPLE 19

Whole raw milk of normal quality is separated into skim milk and cream. The skim milk is concentrated and treated with hydrolyzed lactose-containing milk solids as set forth in Example 1 and then is recombined with the cream. The product is homogenized at 120° F. and 2500 p. s. i., packaged in quart containers and frozen at −20° F. The frozen concentrate can be stored at +15° F. for 10 weeks without developing age thickening.

EXAMPLE 20

Cheddar cheese whey or other cheese or casein whey is heated to 190° F. and held at that temperature for 30 minutes. Then it is concentrated to a 30% solids content and its temperature adjusted to 123° F., following which it is brought to a pH of 6.6 by the addition of a 30% solution of caustic soda. Yeast lactase prepared as set forth in Example 1 is made into a slurry and added in the ratio of 1 part yeast lactase solids to 40 parts lactose content in the whey. The mixture is held at 123° F. for about 6 hours, sufficient to hydrolyze from 60 to 80% of the lactose, and flash pasteurized at 185° F. for 15 seconds. The product can be further concentrated to a 65 to 75% total solids concentration, if desired.

This product containing a large proportion of hydrolyzed lactose can be packaged, frozen at −20° F. and stored at +10 to 15° F. for many weeks without developing age thickening.

If desired, the lactase hydrolysis of lactose can be permitted to proceed to completion by holding the concentrated whey at 123° F. for 10 to 16 hours rather than 6 hours as set forth. The resulting product after further concentration to from 60 to 75% total solids can be used as a source of hydrolyzed lactose-containing whey solids which can be incorporated in unhydrolyzed whey in any desired proportions in an amount to inhibit age thickening in the frozen concentrate.

It is interesting to note that age thickening is not inhibited merely by addition of simple sugars to concentrated milks. Maltose, sucrose, fructose, dextrin, invert sugar and corn syrup have been added to milk concentrates without any noticeable effect upon age thickening. On the other hand galactose has been found to measurably inhibit age thickening. It seems reasonable to suppose that the lactase hydrolysis leads to other changes not yet determined, possibly including formation of other sugars, and these changes are responsible at least in part for the remarkable inhibition of age thickening in the frozen concentrate.

The frozen concentrate of the invention will reconstitute with addition of water after storage to produce a milk product with a flavor not appreciably different from that of fresh milk. A concentrate which will resist frozen age thickening at 15° F. for from 10 to 12 weeks facilitates the supply of fresh milk on steamships traveling to foreign ports, and to the armed services. Frozen skim milk concentrates which keep from 3 to 6 months provide a beneficial means of storing milk solids-not-fat from the flush periods of late spring and early summer to the fall and early winter period when milk solids-not-fat are in short supply. At present, skim milk is stored either as a powder or sweetened condensed milk, a considerably less advantageous expedient. Dog foods and animal feeds which are susceptible to protein coagulation coupled with poor reconstitution upon thawing can be beneficially improved by the addition of hydroylzed lactose-containing whey solids in accordance with the invention.

All parts and percentages in the specification and claims are by weight. Proportions involving hydrolyzed and unhydrolyzed lactose milk solids are based on the total dry weight of the milk solids in question, and not on the hydrolyzed and unhydrolyzed lactose content thereof, inasmuch as the end products of the lactase hydrolysis are not fully known.

The term "consisting essentially of" as used in the appended composition claims leaves the claims open for the inclusion of unspecified materials which do not alter the basic and novel characteristics of the composition.

This application is a continuation-in-part of my copending application Serial No. 198,506, filed November 30, 1950.

I claim:

1. A process of preparing a frozen concentrated milk product having improved resistance to the development of age thickening upon storage, comprising blending lactase hydrolyzed lactose-containing milk solids with a concentrated milk product and freezing the resulting concentrate.

2. A process in accordance with claim 1 in which the lactase hydrolyzed lactose-containing milk solids are in the form of a liquid lactase hydrolyzed lactose-containing milk product.

3. A process in accordance with claim 2 in which the lactase hydrolyzed lactose-containing milk solids are in the form of dried lactase hydrolyzed lactose-containing milk solids.

4. A process of preparing a frozen concentrated milk product having improved resistance to the development of age thickening upon storage, comprising blending lactase hydrolyzed lactose-containing milk solids with a concentrated milk product and homogenizing and freezing the concentrate.

5. A process of preparing a frozen concentrated milk product having improved resistance to the development of age thickening on storage which comprises separating the milk product into two portions, pasteurizing one portion, concentrating the said pasteurized portion to at least a 20% solids content, adding lactase enzyme thereto, hydrolyzing lactose by holding the concentrate under conditions favoring lactase hydrolysis of lactose to simple sugars, inactivating the lactase enzyme, blending the hydrolyzed concentrate with the unhydrolyzed portion and freezing the resulting concentrate.

6. A process of preparing a frozen concentrated milk product having improved resistance to the development of age thickening on storage which comprises separating whole milk into cream and skim milk, pasteurizing the skim milk, concentrating the said pasteurized skim milk to at least a 20% solids content, adding lactase enzyme thereto, hydrolyzing lactose by holding the concentrate under conditions favoring lactase hydrolysis of lactose to simple sugars, inactivating the lactase enzyme, blending the hydrolyzed concentrated skim milk with the unhydrolyzed cream and freezing the resulting concentrate.

7. A process of preparing a frozen concentrated milk product having improved resistance to the development of age thickening on storage, comprising pasteurizing the milk product, concentrating the product to at least a 20% solids content, adding lactase enzyme thereto, hydrolyzing lactose by holding the concentrated product under conditions favoring lactase hydrolysis of lactose to simple sugars, inactivating the lactase enzyme before hydrolysis of the lactose has proceeded to its fullest extent, and freezing the resulting concentrate.

8. A process in accordance with claim 7 which includes homogenizing the hydrolyzed concentrated product prior to freezing.

9. A process in accordance with claim 7, in which skim milk is the milk product and cream is added to the hydrolyzed concentrate to an optimum fat:solids-not-fat ratio.

10. A water-reconstitutable composition consisting essentially of a frozen concentrated milk product and an amount of lactase hydrolyzed lactose-containing milk solids to delay age-thickening on storage.

11. A composition according to claim 10 in which the milk product is a skim milk product.

12. A composition according to claim 10 in which the milk product is a whole milk product.

13. A composition according to claim 10 in which the milk product is a whey product.

EDWIN G. STIMPSON.

References Cited in the file of this patent

UNITED STATES PATENTS

| Number | Name | Date |
|---|---|---|
| 552,681 | Bernstein | Jan. 7, 1896 |
| 597,378 | Backhaus | Jan. 18, 1898 |
| 1,654,176 | Kohman | Dec. 27, 1927 |

(Other references on following page)

UNITED STATES PATENTS

| Number | Name | Date |
|---|---|---|
| 1,840,392 | Hill | Jan. 12, 1932 |
| 2,225,553 | Conquest | Dec. 17, 1940 |
| 2,319,186 | Ingle | May 11, 1943 |
| 2,343,713 | Spur | Mar. 7, 1944 |
| 2,376,693 | Helmer et al. | May 22, 1945 |
| 2,482,724 | Baker | Sept. 20, 1949 |

OTHER REFERENCES

"The Determination of Curd Tension By the Use of Hydrochloric Acid-Pepsin Coagulant," by D. Miller, Journal of Dairy Science, April 1935, vol. 18, No. 4, pages 259–264.

"The Chemistry and Technology of Enzymes," by Henry Tauber, published 1949 by John Wiley and Sons, Inc., New York City, pages 57, 58.

"Fermented Milks," United States Dept. of Agri., Dept. Bulletin No. 312, revised November 1928, pages 15–18.